United States Patent [19]

Hoover et al.

[11] Patent Number: 4,839,411

[45] Date of Patent: Jun. 13, 1989

[54] SOLID STATE CURING OF POLY(ARYLENE SULFIDE) RESINS IN REDUCED OXYGEN ATMOSPHERES

[75] Inventors: Kenneth C. Hoover; Fred T. Sherk; Joseph E. Figard, all of Bartlesville, Okla.

[73] Assignee: Phillips Petroleum Company, Bartlesville, Okla.

[21] Appl. No.: 99,870

[22] Filed: Sep. 22, 1987

[51] Int. Cl.$^4$ .................. C08K 3/26; C08L 81/04
[52] U.S. Cl. ................. 524/424; 524/502; 524/609; 525/189; 525/471; 525/537; 528/388; 528/490
[58] Field of Search .......... 524/424, 502, 609; 525/537, 471; 528/388

[56] References Cited

U.S. PATENT DOCUMENTS

| | | | |
|---|---|---|---|
| 3,354,129 | 11/1967 | Edmonds, Jr. et al. | 260/79 |
| 3,524,835 | 8/1970 | Edmonds, Jr. et al. | 260/79.1 |
| 3,717,620 | 2/1973 | Rohlfing | 260/79 |
| 3,793,256 | 2/1974 | Scoggin | 260/79 |
| 3,839,301 | 10/1974 | Scogins | 525/537 |
| 4,064,115 | 12/1977 | Stapp et al. | 528/388 |
| 4,274,993 | 6/1981 | Narisawa et al. | 260/37 |
| 4,377,660 | 3/1983 | Vioes et al. | 525/537 |
| 4,383,080 | 5/1983 | Dupree | 525/537 |
| 4,424,338 | 1/1984 | Cleary | 528/388 |
| 4,510,297 | 4/1985 | Moberly | 525/537 |
| 4,581,411 | 4/1986 | Liang et al. | 525/189 |

*Primary Examiner*—Lewis T. Jacobs
*Assistant Examiner*—David W. Woodward
*Attorney, Agent, or Firm*—Williams, Phillips & Umphlett

[57] ABSTRACT

Virgin poly(arylene sulfide) resins are oxidatively cured by heat treatment at an elevated temperature below the melting point of the resin, under an oxidizing atmosphere comprising less than a 20 volume % oxygen concentration. The resulting polymer exhibits drastically improved thermal stability with no apparent sacrifice in physical properties.

47 Claims, 8 Drawing Sheets

SOLID STATE CURING OF POLY(ARYLENE SULFIDE) RESINS IN REDUCED OXYGEN ATMOSPHERES

FIELD OF THE INVENTION

This invention relates to solid state curing of arylene sulfide polymers. In one aspect, this invention relates to a process for increasing the molecular weight (i.e., decreasing the melt viscosity) of virgin poly(arylene sulfide) resins. In another aspect, the invention pertains to controlled solid state curing of arylene sulfide polymers in a reduced oxygen atmosphere. In another more specific aspect, this invention relates to a process for producing poly(arylene sulfide) resins having improved thermal stabilities.

BACKGROUND OF THE INVENTION

Aromatic sulfide polymers, ranging in consistency from viscous liquids to crystalline solids, are known in the art. While such polymers exhibit desirable properties, for many commercial applications, such as molding compositions, the unmodified (i.e., virgin) polymers normally possess a relatively high melt flow, e.g., above about 4,000 grams/10 minutes, which inhibits their use in many applications. For example, when exposed to processing temperatures above their melting point, the virgin polymers require extensive processing times or special apparatus for thin film processing. The high melt flow (low viscosity) of the virgin arylene sulfide polymers makes it difficult to handle these virgin resins by conventional molding practices. Since aromatic sulfide polymers possess many desirable properties which make them extremely useful, it would be advantageous to improve the processability of the polymers without materially affecting any of their desirable properties.

One technique for achieving the improvement in processability is demonstrated in U.S. Pat. No. 3,793,256, henceforth Patent '256. Specifically, Patent '256 discloses, among other things, a method to improve processabilty of a polymeric resin by oxidatively curing the virgin polymer. Since this oxidative curing process comprises exposing of the virgin resin, preferably in particulate form, to an oxidizing atmosphere, while being heated to a temperature below the resin's melting, this process is often referred to as "solid state" curing. Patent '256 further discloses that the oxygen content in air, (i.e., approximately 20 volume %) is preferred to achieve the desirable results of the oxidative curing process disclosed therein. Therefore, since the publication of Patent '256, air has generally been used as the oxidizing atmosphere to cure a virgin poly(arylene sulfide) resin. Conversely, if such a polymeric resin is to be employed for the purposes of, for example, encapsulations and/or coatings, the resin must have its melt flow value increased.

It should be noted that the term "curing", with respect to poly(arylene sulfide) polymers, is not necessarily synonymous with the meaning of that term when applied to other polymers, such as in the "curing" of natural or synthetic rubber with sulfur as the vulcanizing agent, or the curing of unsaturated polyester compositions with styrene as the crosslinking agent. The complete curing of such rubber or unsaturated polyester compositions results in an irreversible conversion from the thermoplastic state to the thermal set state. The curing of poly(arylene sulfide) resins, on the other hand, differs in that these resins are thermoplastic, both before and after such curing, although not necessarily to the same degree. Thus, the curing of PAS resins, and objects formed therefrom, produces changes in extrudability, toughness, and other important properties.

While, for certain commercial applications, it is desirable to decrease the melt flow (increase melt viscosity) of a virgin poly(arylene sulfide) resin, it is equally desirable to have a resin which is thermally stable when in the melted phase. In other words, it is desirable to have a polymeric resin whose melt viscosity does not substantially change while the resin is held at a temperature above its melting point for a given period of time. The reason thermal stability is such an important factor is that in many commercial applications, cured polymeric resins often undergo at least one melt processing step. A typical example of a commercial processing procedure is when a cured resin is first made into a polymer composition by adding to the melted resin various fillers such as glass, fibers, and/or fiberglass. The polymer composition is then often sent to be processed into a final and/or intermediate molded product. This latter processing step often requires that the polymer composition also be heated to a temperature above the melting point of the resin used in its preparation.

Due to inherent physical restraints of commercial processing equipment, it is generally necessary to feed, into the processing equipment, resinous material having a melt viscosity within a specifically narrow range. As illustrated above, the resinous material was exposed to temperatures above its melting point at two different occurrences. Therefore, in that example, if the thermal stability of the cured resin was low (i.e., melt viscosity changed greatly as the resin was maintained in a melted phase), it would be difficult, if not impossible, to determine what its initial melt viscosity should be in order for its final melt viscosity to ultimately fall within the specified range. If, on the other hand, the cured resin is thermally stable in the melt, it will be exceedingly easier to synthesize a resin which will retain the desired flow properties. Accordingly, one object of this invention is to provide a process for preparing thermally stable cured arylene sulfide polymeric resins.

Another object of this invention is to produce polymeric compositions from arylene sulfide resins treated by the novel process of this invention.

Yet a further object of this invention is to make a molded article made from either an arylene sulfide resin, cured by the process of this invention, or a polymeric composition made by using the novely cured resin.

Other objects, aspects, and advantages of this invention will be apparent to those skilled in the art upon reading the specification and appended claims which follow.

SUMMARY OF THE INVENTION

In accordance with this invention, virgin poly(arylene sulfide) resins are oxidatively cured by heating the resin, while in a solid state, in the presence of an oxidizing atmosphere comprising less then 20 volume % oxygen.

It has been discovered that, while the time needed to decrease the melt flow (increase melt viscosity) of a virgin poly(arylene sulfide) resin to a predetermined value, by heating the virgin resin, to a temperature below its melting point, while being subjected to an oxidizing atmosphere comprising less then 20 volume % oxygen, does not significantly differ from the time needed to oxidatively cure the same resin, at the same temperature, when air is used as the oxidizing atmosphere, the resulting thermal stability of the resin cured in the presence of the oxidizing atmosphere comprising less than 20 volume % oxygen, is significantly greater than that of the same resin cured at the same temperature when air is used as the oxidizing atmosphere. poly(arylene sulfide).

A more complete appreciation of the invention and many attendant advantages thereof will be readily obtained as the same becomes better understood by reference to the following detailed description when considered in connection with the accompanying figure briefly described below.

DETAILED DESCRIPTION OF THE INVENTION

As referred to herein, the term "arylene sulfide polymer" and/or "poly(arylene sulfide)" abbreviated as "PAS" are intended to include polymers of the type which are prepared as described in U.S. Pat. No. 3,354,129. For example, in that patent, polymers are prepared by reacting polyhaloaromatic compounds with an alkali metal sulfide in the presence of a polar organic compound. The resulting polymers contain the aromatic structure of the polyhalo compound coupled in repeating units through a sulfur atom. The term "virgin" when used to identify a type of poly(arylene sulfide) resin, refers to a polymer which has not undergone any subsequent oxidative heat treatment (i.e., curing).

As used herein, the term "melt flow" refers to the rate at which a melted polymeric resin flows through an orifice when subjected to a downward pressure. In this invention, melt flow is recorded in units of grams of extrudate per 10 minutes (g/10 min.), and is based on ASTM D1238, Procedure B, entitled "Automatically Timed Flow Rate Measurement". For example, in determining the fow rate for poly(phenylene sulfide) resins, having a melting point of about 285° C. (515° F.), the resin is heated to 316° C. (600° F.), while using a total driving mass of 5 kilograms. The orifice through which the melted poly(phenylene sulfide) resin is extruded has an inside diameter of 0.825±0.002 inch and a length of 0.315±0.001 inch. Therefore, a high viscosity polymer will have a low melt flow reading, and vise versa. In other words, the terms "melt flow" and "viscosity" are inversely related.

The term "cure rate" as used herein, refers to the final melt flow of a polymeric resin which has been heated to an elevated temperature, below its melting point, and held at that temperature for a given period of time while being subjected to a gaseous oxidizing atmosphere. For example, the 6 hour cure rate of a specific poly(arylene sulfide) resin is that resin's melt flow, after it has been subjected to the set curing temperature for a 6 hour period.

The term "extrusion rate", as used herein, is similar to the term melt flow in that it also refers to the rate at which a melted polymeric resin flows through an orifice when subjected to a downward pressure. Since extrusion rate testing uses more limiting parameters then does melt flow testing, polymers having high melt flows (low viscosities) can be characterized with more accuracy. A particular resin's extrusion rate is recorded in units of grams of extrudate per 10 minutes (g/10 min.) and is based on a modification of ASTM D1238. The modifications to ASTM D1238, implemented in extrusion rate testing, are the use of (1) a 345-gram driving mass and (2) an orifice having a length of 1.250±0.001 inch.

As used herein, the term "thermal stability" refers to the degree of change in the melt viscosity of a cured resin, while that resin is held at a temperature above its melting point for a given period of time. As the thermal stability of a given resin improves (i.e., increases), the degree at which its melt viscosity changes over time, decreases.

For this invention, the thermal stability of a cured resin is determined by the use of a Rheometrics Dynamic Spectrometer, henceforth RDS, as supplied by Rheometrics, Inc., in Piscataway, N.J. Broadly, the RDS determines a change in the viscosity of a sample at a given temperature, generally above the sample's melting point, by monitoring the viscosity of a heated sample as a function of frequency and/or time.

This invention is broadly applicable to PAS resins formed by any known technique. It is used, for example, with resins wherein polyhalo-substituted aromatic compounds are reacted with sulfur-containing reactants in a polar organic solvent, optionally, with the polymerization modifying components either in batch or continuous operations. Generally, the polymers which are prepared for use by this inventive process, because of the high availability of the material from which they can be prepared, are those having the repeating unit R-S, wherein R is selected from the group comprising phenylene, biphenylene, napthalene, biphenylene ether, and lower alkyl-substituted derivatives thereof. The phrase "lower alkyl", as used above, refers to alkyl groups having 1 to 6 carbon atoms. Examples of such lower alkyls include, but are not limited to, methyl, propyl, isobutyl, hexyl, and the like.

The PAS resins most apt to be treated by the process of this invention are those wherein the arylene group is a phenylene group. Generally, this inventive process can be used to improve the processability of phenylene sulfide polymers selected from the group comprising poly(phenylene sulfide), poly(biphenylene sulfide ketone), poly(phenylene sulfide diketone), poly(biphenylene sulfide), and the like. Particularly applicable to this inventive process are PAS resins prepared by reacting mixtures of p-dichlorobenzene and 1,2,4-trichlorobenzene with a sulfur source and a metal halide at fusion temperatures. Linear polymers formed by use of dihaloaromatic compounds or with crosslinked polymers wherein polyhaloaromatic compounds are added with the polymer to aid cross-linking can also be used.

In accordance with this invention, an improved PAS resin can be prepared by heating a virgin PAS resin, in particular form, in the presence of a gaseous oxidizing atmosphere comprising less than about 20 volume % oxygen, at a temperature below the melting point of the resin, for a time sufficient to effect a desired reduction in the melt flow (increase in viscosity) of the resin.

The melting point of PAS resins can be readily determined by any suitable method. One such suitable method is by determining the Differential Thermal Analysis (DTA) of the sample by heating a 10 mg sample of the polymer at a rate of 10° C. per minute. The melting point is taken from the DTA thermogram in a conventional manner. It has been discovered that while the polymer cured by the process of this invention retains its original physical appearance and cure rate, it, nevertheless, exhibits a thermal stability which is significantly greater than that of the same resin which was cured while in the presence of a gaseous oxidizing atmosphere comprising at least 20 volume % oxygen.

Generally, the curing temperature of a polymeric resin, in accordance with the inventive process disclosed herein, will be in the range from about 10° C. to about 70° C., preferably from about 25° C. to about 55° C., below the melting point of the polymer being treated. The time during which the resin is held at such a temperature depends upon many different factors, such as the desired degree of cure. Ordinarily, the resin would be maintained at the desired temperature for a period of time ranging from about 10 minutes to about 3 days, usually, however, from about 2 to about 12 hours. The longer curing times are generally associated with the use of lower temperatures and vice versa, depending specifically on the type of polymer being processed.

As indicated above, the curing of the PAS resin is to be carried out while in the presence of a gaseous oxidizing atmosphere, wherein the oxygen concentration of this atmosphere is less than about 20 volume %. In a presently preferred embodiment, the gaseous oxidizing atmosphere is a mixture of air and any suitable inert gas. Examples of such suitable inert gases include, but are not limited to, steam, nitrogen, carbon dioxide, and the like, or mixtures thereof. For economic purposes, however, the preferred inert gas is nitrogen.

As the concentration of oxygen in the atmosphere used to cure a virgin polymer resin continues to decreases below that of 20 volume %, the thermal stability of the resulting cured resin continues to significantly improve. However, due to both the large quantities of resin which are cured in a commercial curing vesesl and the inherent cost of inert gases, for commercial applications, the oxygen concentration in volume % of the gaseous oxidizing atmosphere will generally range from about 18 volume % to about 1 volume %, preferably, from about 15 volume % to about 3 volume %, and more preferably, from about 12 volume % to about 6 volume %.

After the desired level of cure has been achieved by the process of this invention, the heating process and the passage of the oxidizing gas comprising less than 20 volume % oxygen, through the body of solid particles of PAS resin, are terminated. The residue of the oxidizing gas can optionally be purged from the body of the particulate material by the passage therethrough of an inert gaseous medium. Examples of such inert gaseous purging mediums include, but are not limited to, steam, nitrogen, carbon dioxide, and the like, or mixtures thereof. For economic purposes, however, the preferred inert gas is nitrogen. This optional purging can generally be completed in from about 1 minute to about 30 minutes, preferably from about 1 minute to about 10 minutes, and more preferably in less than about 5 minutes. The body of cured particles of PAS resin is then cooled, while in the presence of an inert gaseous medium and in the at least substantial absence of any oxidizing gas, until the temperature of the particulate resin falls below a temperature at which no significant amount of further curing would occur in the presence of any oxidizing gas.

The method of cooling the cured PAS resin can be accomplished by any suitable means. In a presently preferred embodiment, the cooling is accomplished by heat flow from the particulate resin, through the curing vessel wall, to a cooling medium. Another suitable method of cooling is by the passage, through the interstices of the particulate body, of a cool stream of an inert medium, such as nitrogen. After the temperature of the solid resinous particles has been lowered to the temperature at which no significant further curing will take place when in the presence of any oxidizing gas, further cooling of the particles to atmospheric temperature can be accomplished by any suitable means, preferably, by contacting the particles with a flowing stream of air at atmospheric temperature.

This invention will be more fully understood from the following examples. These examples are only intended to demonstrate select embodiments of the invention and are, in no way, intended to limit the scope thereof.

EXAMPLE I

This example demonstrates how the concentration of oxygen within the gaseous oxidizing atmosphere used in the curing process of a PAS resin effects the time needed to cure the resin to a predetermined melt flow. The PAS resin used in this example was a virgin poly(phenylene sulfide), abbreviated as "PPS", commercially available from Phillips 66 Company as Ryton ® poly(phenylene sulfide), having a melting point of 285° C. (515° F.), an extrusion rate of about 50 g/10 min., and a 6 hour cure rate at 264° C. (507° F.) of 119 g/10 min.

A first 150cc sample of the above particulate PPS resin was placed in a laboratory curing vessel wherein the gas purge composition was controllable. Nitrogen gas was purged through the curing vessel while the temperature of the contents therein was raised to 260° C. (500° F.). When the internal temperature of the vessel reached 260° C. (500° F.), the nitrogen purge stream was terminated and replaced with a stream of air flowing at a rate of 1 SCFH. This curing process was permitted to continue for 6 hours.

At the end of this 6 hour curing period, the contents within the curing vessel were permitted to cool and the flow of air therethrough was replaced with a nitrogen purge stream. When the internal temperature of the curing vessel reached 66° C. (150° F.), the nitrogen purge stream was terminated and the modified particulate resin was removed and permitted to cool to atmospheric temperature. Henceforth, this resin will be referred to as Resin 1.

A viscosity spectra, demonstrating the level to which Resin 1 was cured, was plotted with data points obtained by using a Rheometrics Dynamic Spectrometer (RDS). This spectra is shown in a graph illustrated in FIG. 1.

Figure 1:
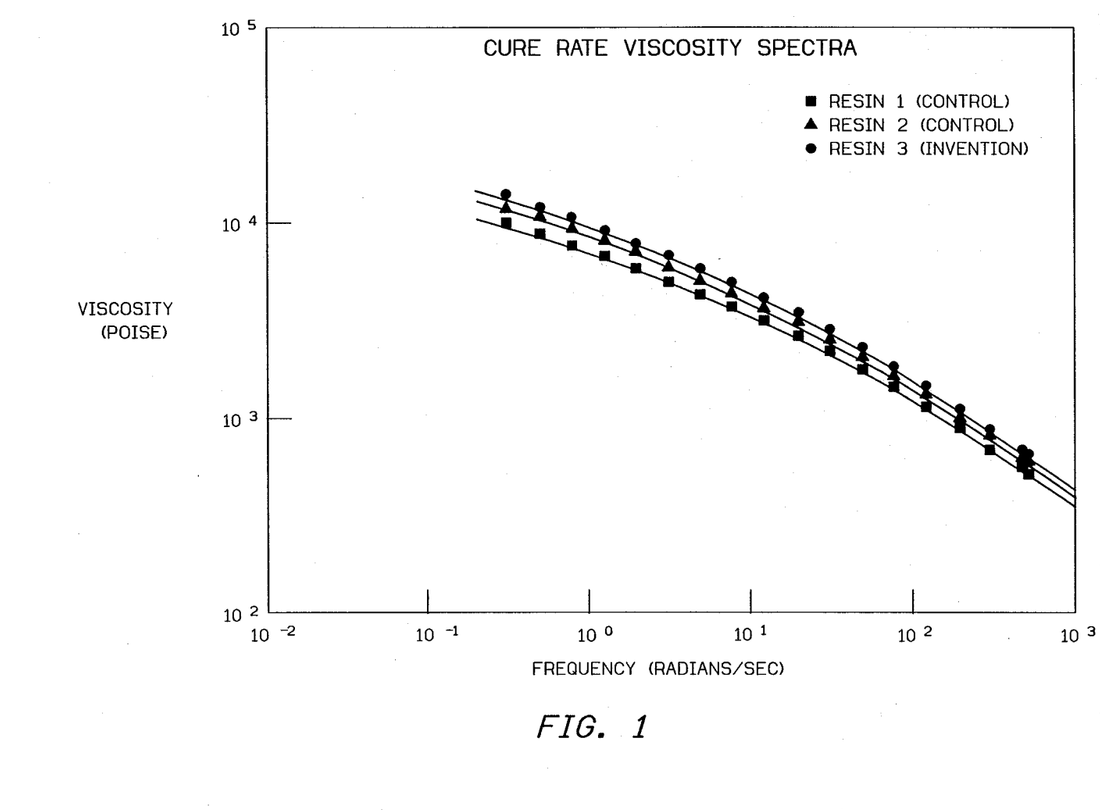
FIG. 1 is a Cure Rate Viscosity Spectra of resins cured in the presence of an oxidizing atmosphere containing varying concentrations of oxygen.

A sample was prepared for the RDS by first cold-pressing, under a pressure of approximately 10,000 psi, a 1-gram sample of Resin 1 in a 1 inch diameter die to form a disc which was approximately ⅛ inch thick. The disc was then dried in a vaccum oven, at 100° C. (200° F.), under a nitrogen purge, for approximately 2 hours. The RDS was operated in a frequency sweep mode starting at 0.30 and ending at 500.00 radians/seconds, at 300° C. (542° F.), using 1 inch diameter, circular, parallel plate platens spaced 1.0mm apart, at a 15 volume % strain on the sample. The sample was heated to the desired temperature by using a continuous stream of heated nitrogen. The RDS monitored the viscosity (poise) of Resin 1 as a function of frequency (rad./sec.). The data collected by the RDS is listed in Table I.

Two additional PPS resin samples (i.e., Resins 2 and 3, inclusive) were cured and analyzed in accordance with the same procedure set out for Resin 1. The only difference between the curing process of Resin 1 and that of either Resins 2 or 3 was the oxidizing atmosphere used.

Specifically, Resin 2 was cured using an oxidizing atmosphere comprising a 50 volume % oxygen concentration. This concentration was achieved by blowing, through the cure vessel, during the 6 hour curing process, a mixture of 70 volume % air and 30 volume % oxygen at a rate of 1 SCFH.

A viscosity spectra, demonstrating the level to which Resin 2 was cured, was plotted with data points obtained by the RDS. This spectra is plotted on the graph in FIG. 1. The data used to plot the viscosity spectra of Resin 2, as obtained by the RDS, is listed in Table I.

Resin 3 was cured using an oxidizing atmosphere comprising a 10 volume % oxygen concentration. This was achieved by blowing, through the cure vessel, during the 6 hour curing process, a mixture of 50 volume % air and 50 volume % nitrogen at the rate of 1 SCFH.

A viscosity spectra, demonstrating the level to which Resin 3 was cured, was plotted with data points obtained by the RDS. This spectra is plotted on the graph in FIG. 1. The data used to plot the viscosity spectra of Resin 3, as obtained by the RDS, is listed in Table I.

TABLE 1

| | Effect of Oxygen Concentration on Cure Rate | | |
|---|---|---|---|
| | Viscosity (poise) of: | | |
| Frequency (rad/sec) | Resin 1 (Control) | Resin 2 (Control) | Resin 3 (Invention) |
| 0.300 | 9,878 | 13,602 | 11,741 |
| 0.476 | 8,657 | 11,678 | 10,763 |
| 0.754 | 7,592 | 10,312 | 9,276 |
| 1.194 | 6,673 | 9,020 | 8,161 |
| 1.893 | 5,789 | 7,772 | 7,000 |
| 3.000 | 5,005 | 6,676 | 6,007 |
| 4.755 | 4,301 | 5,732 | 5,130 |
| 7.536 | 3,695 | 4,873 | 4,356 |
| 11.940 | 3,145 | 4,113 | 3,671 |
| 18.930 | 2,648 | 3,435 | 3,062 |
| 30.000 | 2,199 | 2,827 | 2,526 |
| 47.550 | 1,795 | 2,289 | 2,053 |
| 75.360 | 1,445 | 1,825 | 1,644 |
| 119.400 | 1,148 | 1,437 | 1,301 |

TABLE 1-continued

| | Effect of Oxygen Concentration on Cure Rate | | |
|---|---|---|---|
| | Viscosity (poise) of: | | |
| Frequency (rad/sec) | Resin 1 (Control) | Resin 2 (Control) | Resin 3 (Invention) |
| 189.300 | 905 | 1,123 | 1,023 |
| 300.000 | 714 | 876 | 805 |
| 475.500 | 565 | 686 | 635 |
| 500.000 | 544 | 658 | 612 |

As can be seen from the viscosity spectras and the 6 hour cure rates of Resins 1-3, the level of cure of a particular PPS resin is not significantly effected by the concentration of oxygen within the oxidizing atmosphere.

EXAMPLE II

This example demonstrates how the concentration of oxygen within the gaseous oxidizing atmosphere of a curing process effects the thermal stability of the oxidatively cured PAS resin. The PAS resin used in this example was the same resin used in Example I.

In this example the thermal stability of Resins 1-3 (Example I) were determined over a 30 minute period using an RDS. The samples were prepared for the RDS analysis by first cold-pressing, under a pressure of approximately 10,000 psig, 1-gram samples of Resins 1-3, respectively in a 1 inch diameter die to form three individual discs which were each approximately ⅛ inch thick. The discs were then dried in a vacuum oven, at 110° C. (200° F.), under a nitrogen purge, for approximately 2 hours. The RDS was operated in a time sweep mode starting at about 2 minutes and ending at about 33 minutes, at 330° C. (626° F.), using 1 inch diameter, circular, parallel plate platens spaced 1.0mm apart, at 15 volume % strain on each Resin sample. The sample was heated to the desired temperature by using a continuous stream of heated nitrogen.

The RDS monitored the viscosity (poise) of Resins 1-3, respectively as a function time (i.e., minutes). Specifically, after thermal equilibrium was established (i.e., 2.8 minutes), the RDS monitored the viscosity of the individual resin samples in approximately 3 minute time intervals, until the time sweep was completed.

The data collected by the RDS, for comparative purposes, has been normalized by dividing all the viscosities for a given resin by the viscosity monitored at the initial reading. This normalized data is listed in Table II.

TABLE II

| | Effect of Oxygen Concentration on Thermal Stability | | |
|---|---|---|---|
| | Normalized[a] Viscosity (poise) of: | | |
| Time (minutes) | Resin 1 (Control) | Resin 2 (Control) | Resin 3 (Invention) |
| 2.8 | 1.000[b] | 1.000[c] | 1.000[d] |
| 5.9 | 1.154 | 1.175 | 1.308 |
| 8.9 | 1.512 | 1.407 | 1.342 |
| 11.9 | 1.970 | 1.719 | 1.568 |
| 14.9 | 2.160 | 2.021 | 1.661 |
| 18.2 | 2.365 | 2.325 | 1.890 |
| 21.2 | 2.696 | 2.624 | 2.045 |
| 24.2 | 2.895 | 2.988 | 2.296 |
| 27.2 | 3.135 | 3.257 | 2.221 |
| 30.2 | 3.348 | 3.531 | 2.543 |

TABLE II-continued

| | Effect of Oxygen Concentration on Thermal Stability | | |
|---|---|---|---|
| | Normalized[a] Viscosity (poise) of: | | |
| Time (minutes) | Resin 1 (Control) | Resin 2 (Control) | Resin 3 (Invention) |
| 33.4 | 3.597 | 3.898 | 2.571 |

[a]The viscosity data in this table has been normalized by dividing all the viscosities for a given resin by the viscosity monitored at the initial reading.
[b]Non-normalized data point is 7,925 poise.
[c]Non-normalized data point is 9,165 poise.
[d]Non-normalized data point is 7,623 poise.

Figure 2:
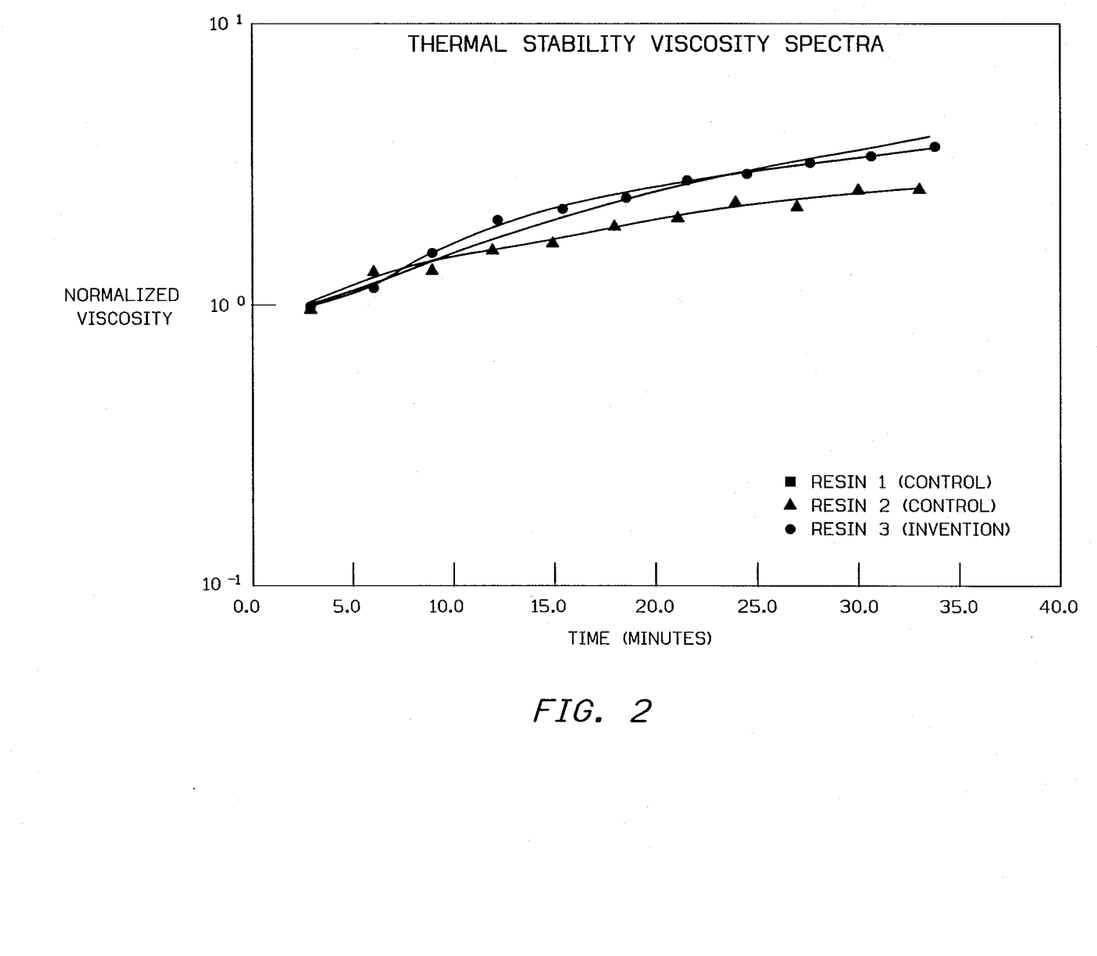
FIG. 2 is a Thermal Stability Viscosity Spectra of resins cured in the presence of an oxidizing atmosphere containing varying concentrations of oxygen.

To visually demonstrate the effectiveness of this invention, the data from Table II is plotted on the graph illustrated in FIG. 2. This data demonstrates that Resin 1, which was cured in a gaseous oxidizing atmosphere comprising a 20 volume % oxygen concentration, exhibits an increase in the melt viscosity of the polymer, during the heating process, of 260 volume %. The data further demonstrates that Resin 2, which was cured in a gaseous oxidizing atmosphere comprising a 50 volume % oxygen concentration, exhibits an increase in the melt viscosity of the polymer, during the heating process, of 290 volume %.

Based upon the data collected for Resins 1 and 2, it should be expected that over the same heating period, the melt viscosity of Resin 3, cured in a gaseous oxidizing atmosphere containing a 10 volume % oxygen concentration, would increase by approximately 250 volume %. However, as seen in both, Table II and FIG. 2, the melt viscosity of Resin 3 increased by only 160 volume %. Therefore, the improvement in the thermal stability of Resin 3 is unexpected in view of the trend established by Resins 1 and 2.

EXAMPLE III

To further demonstrate the effectiveness of this invention, this example provides a further comparison between the thermal stability of a PAS resin cured in an oxidizing atmosphere comprising a 20 volume % oxygen concentration with that of the same resin cured in an oxidizing atmosphere comprising a 10 volume % oxygen concentration.

The PAS resin used in this example was a poly(phenylene sulfide) (PPS) resin prepared by reacting, in a 90-gallon polymerization reactor, 73 lbs. of 50 wt. volume % NaOH, 91 lbs. of 58 wt. volume % NaSH, 32 gallons of N-methyl-pyrrolidone (NMP), and 140 lbs. p-dichlorobenzene (p-DCB), under polymerization conditions disclosed in U.S. Pat. No. 3,354,129. The resulting polymeric resin had an extrusion rate of approximately 59 g/10 min. and a 6 hour cure rate at 264° C. (507° F.) of approximately 20 g/10 min.

A first 46 lb. sample of the above PPS resin was charged to a 2 cu.ft. curing vessel. Nitrogen gas was purged through the vessel while the temperature of the contents therein was raised to 218° C. (425° F.). When the internal temperature of the vessel reached 218° C. (425° F.), the nitrogen purge stream was replaced with a stream of air flowing at a rate of 2.5 SCFH. The resin cured under these conditions will henceforth be referred to as Resin 4.

At various time intervals during this curing process, samples of Resin 4 were removed from the curing vessel for analysis. The melt flows of these samples, at their respective times, were determined using ASTM D1238 and are recorded in Table III. This curing process was permitted to continue until the melt flow of Resin 4 fell within a predetermined target range of between 155 and 115 g/10 min. When Resin 4 was cured to within the targeted melt flow range, the heating process was terminated and the oxidizing atmosphere (i.e., air) was replaced with a stream of nitrogen. The external jacket of the curing vessel was cooled by being contacted with a stream of cooled oil.

When the temperature of the contents within the curing vessel cooled to approximately 54° C. (130° F.), cured Resin 4 was removed from the vessel and its final melt flow determined. The final melt flow of Resin 4 and the time needed to reach the targeted melt flow range are recorded in Table III.

A second 46 lb. sample of the same PPS resin was cured in accordance with the same procedure set out for Resin 4. This second cured resin will henceforth be referred to as Resin 5. The only difference between the curing process of Resin 4 and that of Resin 5 was the oxidizing atmosphere used. Specifically, Resin 5 was cured using an oxidizing atmosphere comrpising a 10 volume % oxygen concentration. This cncentration was achieved by blowing, through the curing vessel, during the curing process, a mixture of 50 volume % air and 50 volume % nitrogen at a rate of 2.5 SCFH.

Samples of Resin 5 were removed from the vessel during the curing process for analysis. The melt flows of these samples at their respective times, were determined using ASTM D1238 and are recorded in Table III. When Resin 5 was cured to within the same targeted melt flow range as stated above for Resin 4, the curing process was terminated and the contents within the curing vessel were permitted to cool.

When the temperature of the contents within the curing vessel cooled to approximately 54° C. (130° F.), cured Resin 5 was removed from the vessel and its final melt flow determined. The final melt flow of Resin 5 and the time needed to reach the targeted melt flow range are recorded in Table III.

TABLE III

| Effect of Oxygen Concentration on Cure Rate | | | |
|---|---|---|---|
| Resin 4 (Control) | | Resin 5 (Invention) | |
| Curing Time (hrs.) | Flow Rate (g/10 min.) | Curing Time (hrs.) | Flow Rate (g/10 min.) |
| 0 | — | 0 | — |
| 2.92 | 1268 | 2.45 | 1323 |
| 7.59 | 2157 | 7.18 | 1281 |
| 11.26 | 309 | 11.45 | 1051 |
| 12.26 | 252 | 18.03 | 113 |
| 13.26 | 185 | FINAL | 113 |
| 14.26 | 180 | | |
| 15.26 | 168 | | |
| 16.26 | 156 | | |
| 17.26 | 138 | | |
| FINAL[a] | 128 | | |

[a]The term "FINAL" refers to the flow rate after resin had been cooled to room temperature.

Figure 3:
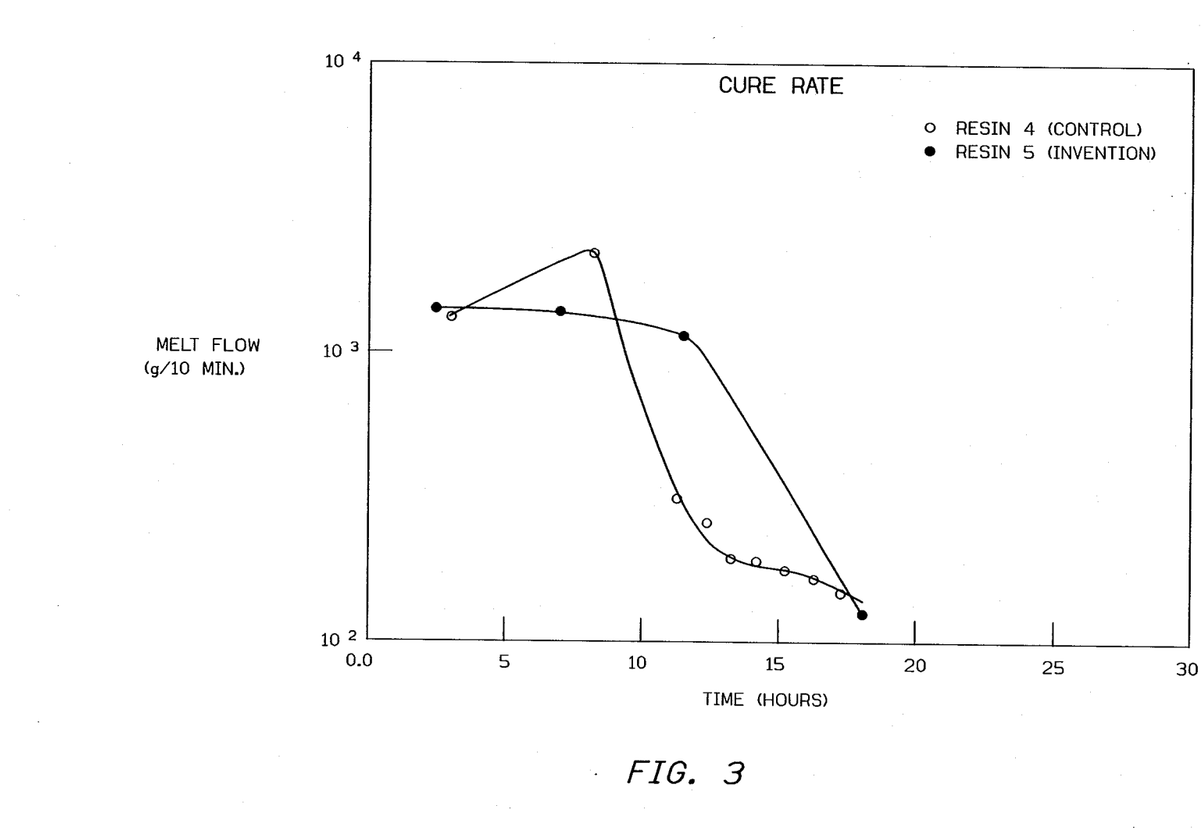
FIG. 3 is a Cure Rate graph of resins cured in the presence of an oxidizing atmosphere containing varying concentrations of oxygen.

To visually demonstrate that curing a PPS resin in an oxidizing atmosphere comprising 10 volume % oxygen does not significantly increase the time needed to achieve a desired melt flow, the data from Table III is plotted on the graph illustrated in FIG. 3. As can be seen by the data in FIG. 3 and in Table III, the time needed to achieve a desired level of cure of a particular PPS resin is not significantly affected by the concentration of oxygen within the oxidizing atmosphere.

The thermal stability of Resins 4 and 5 was then determined over a 60 minute period using an RDS. The samples for this RDS analysis were prepared in accordance with the same procedure set out in Example II.

The RDS monitored the viscosity (poise) of Resins 4 and 5, individually, as a function of time (i.e., minutes). Specifically, after thermal equilibrium was established (i.e., 2.5 minutes), the RDS monitored the viscosity of the individual resin samples in approximately 3 minute time intervals, until the time sweep was completed.

The data collected by the RDS, for comparative purposes, has been normalized by dividing all the viscosities for a given resin by the viscosity monitored at the 2 minute interval. This normalized data is listed in Table IV.

TABLE IV

Effect of Oxygen Concentration on Thermal Stability

| Resin 4 (Control) | | Resin 5 (Invention) | |
|---|---|---|---|
| Time (minutes) | Normalized[a] Viscosity (poise) | Time (minutes) | Normalized[a] Viscosity (poise) |
| 2.5 | 1.000[b] | 2.5 | 1.000[c] |
| 5.6 | 1.331 | 5.5 | 1.180 |
| 8.8 | 1.437 | 8.4 | 1.347 |
| 12.0 | 1.935 | 11.4 | 1.687 |
| 15.2 | 1.891 | 14.3 | 1.477 |
| 18.2 | 2.718 | 17.3 | 1.836 |
| 23.5 | 2.893 | 20.2 | 1.738 |
| 27.9 | 3.355 | 23.2 | 2.012 |
| 35.6 | 4.241 | 26.1 | 2.322 |
| 38.5 | 4.508 | 29.0 | 2.663 |
| 41.8 | 5.064 | 31.9 | 2.413 |
| 44.7 | 5.047 | 35.3 | 2.689 |
| 52.1 | 5.746 | 42.3 | 2.942 |
| 55.2 | 6.290 | 45.2 | 3.056 |
| 58.3 | 6.422 | 50.2 | 3.356 |
|  |  | 58.7 | 4.291 |

[a]The viscosity data in this table has been normalized by dividing all the viscosities for a given resin by the viscosity monitored at initial reading.
[b]Non-normalized data point is 8,789 poise.
[c]Non-normalized data point is 8,432 poise.

Figure 4:
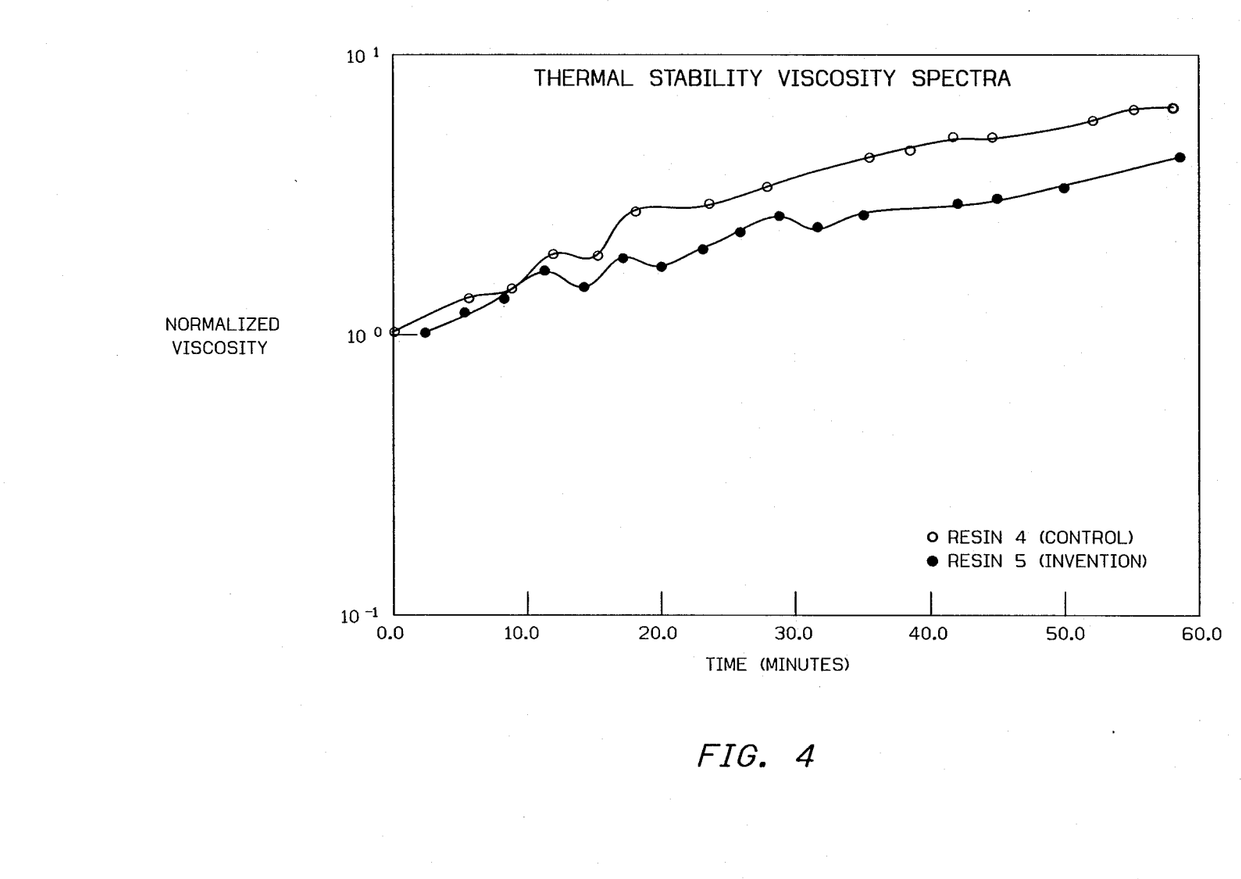
FIG. 4 is a Thermal Stability Viscosity Spectra of resins cured in the presence of an oxidizing atmosphere containing varying concentrations in oxygen.

To visually demonstrate the effectiveness of this invention, the data from Table IV is plotted on the graph illustrated in FIG. 4. This data demonstrates that Resin 4, cured in a gaseous oxidizing atmosphere comprising a 20 volume % oxygen concentration, exhibits an increase in the melt viscosity of the polymer, during the heating process, minute time intervals, of 542 volume %. The data further demonstrates that Resin 5, cured in a gaseous oxidizing atmosphere comprising a 10 volume % oxygen concentration, exhibits an increase in the melt viscosity of the polymer, during the same heating process, of only 312 volume %. Therefore, the thermal stability of the resin, cured in the gaseous oxidizing atmosphere comprising a 10 volume % oxygen concentration (i.e., Resin 5) was significantly improved over that of the same resin cured in an oxidizing atmosphere comprising a 20 volume % oxygen concentration (i.e., Resin 4).

EXAMPLE IV

To further demonstrate the effectiveness of this invention, this example provides a further comparison between the thermal stability of a commercial grade PAS resin cured in an oxidizing atmosphere comprising a 20 volume % oxygen concentration with that of the same commercial grade resin cured in an oxidizing atmosphere comprising varying concentrations of oxygen, all less than 10 volume %.

The PAS resin used in this example was a virgin poly(phenylene sulfide), abbreviated as "PPS" commercially available from Phillips 66 Company as Ryton® poly(phenylene sulfide), having a melting point of 285° C. (515° F.), an extrusion rate of about 76 g/10 min., and a 6 hour cure rate at 264° C. (507° F.) of 66 g/10 min.

A first 45 lb. sample of the above PPS was charged to a 2 cu.ft. curing vessel. Nitrogen gas was purged through the vessel while the temperature of the contents therein was raised to 218° C. (425° F.). When the internal temperature of the vessel reached 218° C. (425° F.), the nitrogen purge stream was replaced with a stream of air flowing at a rate of 2.5 SCFH. The resin cured under these conditions will henceforth be referred to as Resin 6.

At various time intervals during this curing process, samples of Resin 6 were removed from the curing vessel for analysis. The melt flows of these samples, at their respective times, were determined using ASTM D1238 and are recorded in Table V. This curing process was permitted to continue until the melt flow of Resin 6 fell within a predetermined target range of between 155 and 115 g/10 min. When Resin 6 was cured to within the targeted melt flow range, the heating process was terminated and the oxidizing atmosphere (i.e., air) was replaced with a stream of nitrogen. The external jacket of the curing vessel was cooled by being contacted with a stream of cooled oil.

When the temperature of the contents within the curing vessel cooled to approximately 54° C. (130° F.), cured Resin 6 was removed from the vessel and its final melt flow determined. The final melt flow of Resin 6 and the time needed to reach the targeted melt flow range are recorded in Table V.

A second 45 lb. sample of the same PPS resin was cured in accordance with the same procedure set out for Resin 6. This second cured resin will henceforth be referred to as Resin 7. The only difference between the curing process of Resin 6 and that of Resin 7 was the oxidizing atmosphere used. Specifically, Resin 7 was cured using an oxidizing atmosphere, wherein the oxygen concentration was permitted to vary from 8 volume 5 to 1 volume %. This concentration was achieved by blowing, through the curing vessel, during the curing process, a mixture of air and nitrogen and maintaining the total flow of oxidizing atmosphere through the vessel constant at 2.5 SCFH. The concentrations of oxygen contained in the oxidizing atmosphere used to cure Resin 7 are listed in Table V.

Samples of Resin 7 were removed from the vessel during the curing process for analysis. The melt flows of these samples at their respective times, were determined using ASTM D1238 and are recorded in Table V. When Resin 7 was cured to within the same targeted melt flow range as stated above for Resin 6, the curing process was terminated and the contents within the curing vessel were permitted to cool.

When the temperature of the contents within the curing vessel cooled to approximately 54° C. (130° F.), cured Resin 7 was removed from the vessel and its final melt flow determined. The final melt flow of Resin 7 and the time needed to reach the targeted melt flow range are recorded in Table V.

TABLE V

Effect of Oxygen Concentration on Cure Rate

| Resin 6 (Control) | | Resin 7 (Invention) | | |
| --- | --- | --- | --- | --- |
| Curing Time (hrs.) | Flow Rate (g/10 min.) | Curing Time (hrs.) | Curing Conc. (volume %) | Flow Rate (g/10 min) |
| 0 | — | 0 | 8.0 | — |
| 3.00 | 3617 | 4.80 | 7.6 | 2460 |
| 11.67 | 530 | 10.80 | 4.0 | 777 |
| 13.67 | 492 | 18.00 | 2.0 | 340 |
| 16.92 | 259 | 20.92 | 2.0 | 267 |
| 19.59 | 230 | 22.92 | 1.0 | 145 |
| 21.01 | 179 | FINAL[a] | — | 138 |
| 22.18 | 155 | | | |
| 22.76 | 141 | | | |
| FINAL[a] | 144 | | | |

[a]The term "FINAL" refers to the flow rate after resin had been cooled to room temperature.

Figure 5:
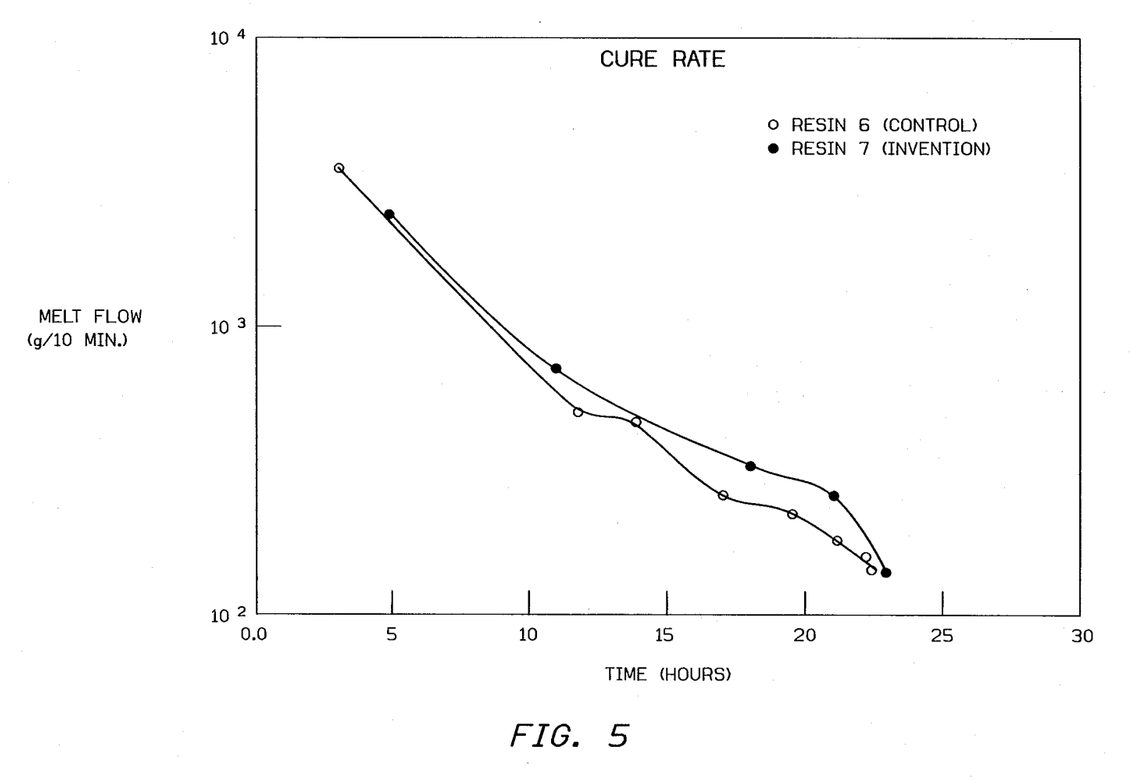
FIG. 5 is a Cure Rate graph of resins cured in the presence of an oxidizing atmosphere containing varying concentrations of oxygen.

To visually demonstrate that curing a PPS resin in an oxidizing atmosphere comprising less then 10 volume % oxygen does not significantly increase the time needed to achieve a desired melt flow, the data from Table V is plotted on the graph illustrated in FIG. 5. As can be seen by the data in FIG. 5 and in Table V, the time needed to achieve a desired level of cure of a particular PPS resin is not significantly effected by the concentration of oxygen within the oxidizing atmosphere.

The thermal stability of Resins 6 and 7 was then determined over a 60 minute period using an RDS. The samples for this RDS analysis were prepared in accordance with the same procedure set out in Example II.

The RDS monitored the viscosity (poise) of Resins 6 and 7, individually, as a function of time (i.e., minutes). Specifically, after thermal equilibrium was established (i.e., 2.5 minutes), the RDS monitored the viscosity of the individual resin samples in approximately 3 minute time intervals, until the time sweep was completed.

The data collected by the RDS, for comparative purposes, has been normalized by dividing all the viscosities for a given resin by the viscosity monitored at the initial time reading. This normalized data is listed in Table VI.

TABLE VI

Effect of Oxygen Concentration on Thermal Stability

| | Normalized[a] Viscosity (poise) of: | |
| --- | --- | --- |
| Time (minutes) | Resin 6 (Control) | Resin 7 (Invention) |
| 2.5 | 1.000[b] | 1.000[c] |
| 5.5 | 1.109 | 1.139 |
| 8.4 | 1.633 | 1.498 |
| 11.4 | 2.016 | 1.746 |
| 14.4 | 2.586 | 2.051 |
| 17.7 | 3.289 | 2.358 |
| 20.6 | 3.899 | 2.617 |
| 23.6 | 4.508 | 2.868 |
| 26.5 | 5.105 | 3.175 |
| 29.5 | 5.719 | 3.435 |
| 32.4 | 6.205 | 3.675 |
| 35.4 | 6.804 | 3.895 |
| 38.3 | 7.240 | 4.142 |
| 41.3 | 7.799 | 4.366 |
| 44.3 | 8.175 | 4.638 |
| 47.2 | 8.741 | 4.796 |
| 50.3 | 9.159 | 5.084 |
| 53.2 | 9.608 | 5.255 |
| 56.3 | 10.014 | 5.535 |
| 59.2 | 10.461 | 5.702 |

[a]The viscosity data in this table has been normalized by dividing all the viscosities for a given resin by the viscosity monitored at initial reading.
[b]Non-normalized data point is 8,372 poise.
[c]Non-normalized data point is 12,224 poise.

Figure 6:
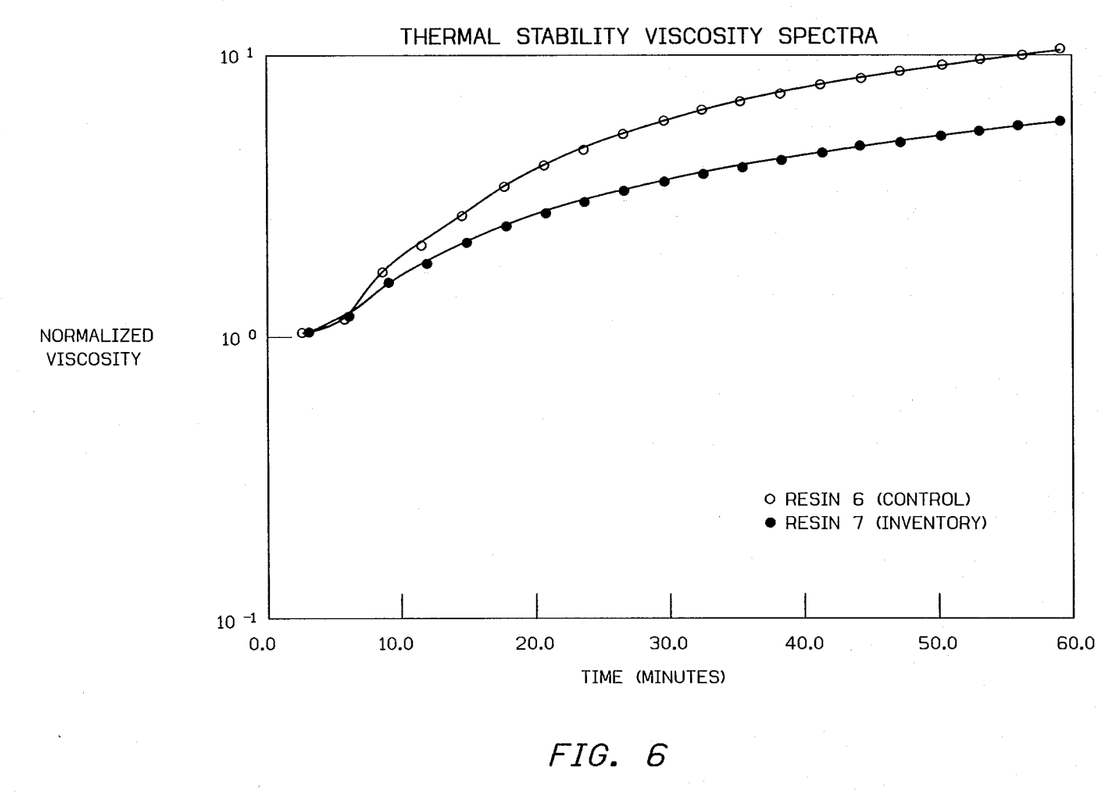
FIG. 6 is a Thermal Stability Viscosity Spectra of resins cured in the presence of an oxidizing atmosphere containing varying concentrations of oxygen.

To visually demonstrate the effectiveness of this invention, the data from Table VI is plotted on the graph illustrated in FIG. 6. This data demonstrates that Resin 6, cured in a gaseous oxidizing atmosphere comprising a 20 volume % oxygen concentration, exhibits an increase in the melt viscosity of the polymer, during the curing process, of 950 volume %. The data further demonstrates that Resin 7, cured in a gaseous oxidizing atmosphere comprising an oxygen concentration of less then 10 volume %, exhibits an increase in the melt viscosity of the polymer, during the curing process, of only 470 volume %. Therefore, the thermal stability of the resin cured in the gaseous oxidizing atmosphere comprising a less then 10 volume % oxygen concentration (i.e., Resin 7) was significantly improved over that of the same resin cured in an oxidizing atmosphere comprising a 20 volume % oxygen concentration (i.e., Resin 6).

EXAMPLE V

This example demonstrates that the thermal stability of a polymer composition, made from a PAS resin, cured in the presence of an oxidizing atmosphere comprising a 10 volume % oxygen concentration, is significantly greater than that of a composition made by using the same PAS resin, cured in the presence of an oxidizing atmosphere comprising a 20 volume % oxygen concentration. This is achieved without any apparent sacrifice in the physical properties of the composition. The PAS polymer used in this example is the same poly(phenylene sulfide) (PPS) polymer prepared in Example III.

In this example, the a first polymeric composition was prepared by dry blending a mixture consisting of 58.75 wt. volume % of Resin 4 (Example III), 40.00 wt. volume % of fiberglass, 1.00 wt. volume % of lithium carbonate as a corrosion inhibitor, and 0.25 wt. volume % of high density polyethylene as a mold release agent. This mixture was extruded through a Davis-Standard ® extruder at a temperature of 316° C. (600° F.). The extruded product was ground into powder. The powder was then dried in a draft oven at 150° C. (302° F.) for 2 hours. This dried polymeric composition will henceforth be referred to as Composition 1.

Composition 1 was molded into a test specimen by using an Arburg ® 221E/170R injection molder with a 316° C. (600° F.) barrel and a 135° C. (275° F.) mold temperature. These test specimens consisted of tensile bars and impact bars. The test specimens made from Composition 1 were subjected to the following ASTM testing procedures: Izod Impact (ASTM D256), Flexural Modulus and Flexural Strength (ASTM D790), Tensile Strength (ASTM D638), and Melt Flow (ASTM D1238). The results of the aforementioned tests were recorded in Table VII.

An additional dried polymeric composition (i.e., Composition 2) was prepared using the same procedure set out for Composition 1. The only difference between the preparation of Composition 1 and that of Composition 2 was the resin used. Specifically, Composition 2 was prepared with Resin 5 (Example III).

Composition 2 was molded into test specimens and subjected to the same tests as those of Composition 1. The results of the aforementioned tests are recorded in Table VII.

TABLE VII

| ASTM Test | Effect of Oxygen Concentration on Physical Properties | |
|---|---|---|
| | Composition 1 (Control) | Composition 2 (Invention) |
| Izod Impact (ft.lb./in.) | 1.7 | 1.7 |
| Flex. Modulus (MSI) | 2.3 | 2.4 |
| Flex. Strength (KSI) | 32.7 | 33.7 |
| Tensile Strength (KSI) | 20.9 | 23.3 |
| Melt Flow (g/10 min.) | 42 | 43 |

The data in Table VII demonstrates that the physical properties of the polymeric composition made from the PPS resin which was cured in a oxidizing atmosphere comprising 10 volume % oxygen (i.e., Composition 2) is not significantly different from that of the composition made from the PPS resin which was cured in a oxidizing atmosphere comprising 20 volume % oxygen (i.e., Composition 1).

The thermal stability of Compositions 1 and 2 was then determined over a 60 minute period using an RDS. The samples for this RDS analysis were prepared in accordance with the same procedure set out in Example II.

The RDS monitored the viscosity (poise) of Compositions 1 and 2, individually, as a function of time (i.e., minutes). Specifically, after thermal equalibrium was established (i.e., 2.5 minutes), the RDS monitored the viscosity of the individual resin samples in approximately 3 minute time intervals, until the time sweep was completed.

The data collected by the RDS, for comparative purposes, has been normalized by dividing all the viscosities for a given resin by the viscosity monitored at the initial reading. This normalized data is listed in Table VIII.

TABLE VIII

| | Effect of Oxygen Concentration on Thermal Stability | |
|---|---|---|
| | Normalized$^a$ Viscosity (poise) of: | |
| Time (minutes) | Composition 1 (Contol) | Composition 2 (Invention) |
| 2.500 | 1.000$^b$ | 1.000$^c$ |
| 5.600 | 1.196 | 1.200 |
| 8.700 | 1.507 | 1.365 |
| 11.700 | 1.751 | 1.417 |
| 14.600 | 1.862 | 1.510 |
| 17.700 | 2.111 | 1.599 |
| 20.700 | 2.306 | 1.713 |
| 23.700 | 2.494 | 1.786 |
| 26.600 | 2.688 | 1.877 |
| 29.600 | 2.862 | 1.966 |
| 32.600 | 3.074 | 2.072 |
| 35.500 | 3.234 | 2.147 |
| 38.500 | 3.433 | 2.265 |
| 41.400 | 3.617 | 2.350 |
| 44.400 | 3.823 | 2.460 |
| 47.300 | 4.757 | 2.559 |
| 51.100 | 5.226 | 2.674 |
| 54.100 | 5.497 | 2.714 |
| 47.100 | 5.790 | 2.840 |
| 60.000 | 5.993 | 2.970 |

$^a$The viscosity data in this table has been normalized by dividing all the viscosities for a given resin by the viscosity monitored at initial reading.
$^b$Non-normalized data point is 31,608 poise.
$^c$Non-normalized data point is 29,878 poise.

Figure 7:
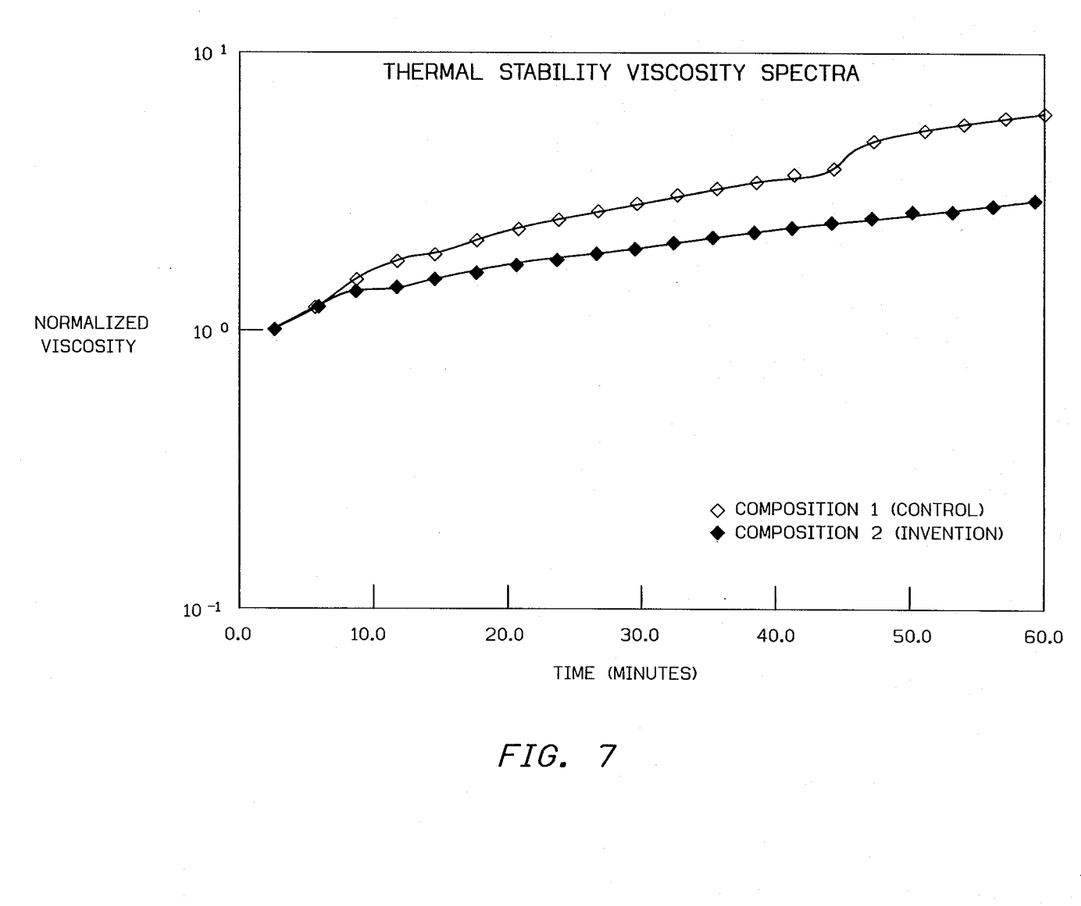
FIG. 7 is a Thermal Stability Viscosity Spectra of resins cured in the presence of an oxidizing atmosphere containing varying concentrations of oxygen.

To visually demonstrate the effectiveness of this invention, the data from Table VIII is plotted on the graph illustrated in FIG. 7. This data demonstrates that Composition 1, which was prepared from Resin 4, cured in a gaseous oxidizing atmosphere comprising a 20 volume % oxygen concentration, exhibits an increase in the melt viscosity of the polymer, during the curing process, of 542 volume %. The data further demonstrates that Composition 2, which was prepared from Resin 5, cured in a gaseous oxidizing atmosphere comprising a 10 volume % oxygen concentration, exhibits an increase in the melt viscosity of the polymer, during the curing process, of only 197 volume %. Therefore, the thermal stability of the polymeric composition which was made from the resin cured in the gaseous oxidizing atmosphere comprising a 10 volume % oxygen concentration (i.e., Composition 2 and Resin 5, respectively) was significantly improved over that of the composition prepared form the same resin cured in an oxidizing atmosphere comprising a 20 volume % oxygen concentration (i.e., Composition 1 and Resin 4, respectively).

EXAMPLE VI

This example demonstrates that the thermal stability of a polymeric composition, made from a commercial PAS resin, cured while in a the presence of an oxidizing atmosphere comprising a less than 10 volume % oxygen concentration, is significantly greater than that of a composition, made by the same commercial resin, cured while in the presence of an oxidizing atmosphere comprising a 20 volume % oxygen concentration. The commercial PAS polymer used in this example is the same poly(phenylene sulfide) (PPS) polymer used in Example IV.

In this example, the a first polymeric composition was prepared by dry blending a mixture consisting of 58.75 wt. volume % of Resin 4 (Example III), 40.00 wt. volume % of fiberglass, 1.00 wt. volume % of lithium carbonate as a corrosion inhibiter, and 0.25 wt. volume % of high density polyethylene as a mold release agent. This mixture was extruded through a Davis-Standard ® extruder at a temperature of 316° C. (600° F.). The extruded product was ground into powder. The powder was then dried in a draft oven at 150° C. (302° F.) for 2 hours. This dried polymeric composition will henceforth be referred to as Composition 3.

Composition 3 was molded into test specimens by using an Arburg ® 22E/170R injection molder with a 316° C. (600° F.) barrel and a 135° C. (275° F.) mold temperature. These test specimens consisted of tensile bars and impact bars. The test specimens made from Composition 3 were subjected to the following ASTM testing procedures: Izod Impact (ASTM D256), Flexural Modules and Flexural Strength (ASTM D790), Tensile (ASTM D638), and Melt Flow (ASTM D1238). The results of the aforementioned tests are recorded in Table IX.

An additional dried polymeric composition (i.e., Composition 4) was prepared using the same procedure set out for Composition 3. The only difference between the preparation of Composition 4 and that of Composition 3 was the resin used. Specifically, Composition 4 was prepared with Resin 6 (Example IV).

Composition 4 was molded into test specimens and subjected to the same tests as those of Composition 3. The results of the aforementioned tests are recorded in Table IX.

TABLE IX

| ASTM Test | Effect of Oxygen Concentration on Physical Properties | |
|---|---|---|
| | Composition 3 (Control) | Composition 4 (Control) |
| Izod Impact (ft.lb./in.) | 1.8 | 1.8 |
| Flex. Modulus (MSI) | 2.3 | 2.3 |
| Flex. Strength (KSI) | 33.4 | 34.0 |
| Tensile Strength (KSI) | 22.5 | 21.8 |
| Melt Flow (g/10 min.) | 46 | 48 |

The data in Table IX demonstrates that the physical properties of the polymeric composition made from a commercial grade PPS resin, cured in a oxidizing atmosphere comprising less than 10 volume % oxygen (i.e., Composition 4), are not significantly different from that of the composition made from the same commercial grade PPS resin, cured in a oxidizing atmosphere comprising 20 volume % oxygen (i.e., Composition 3).

The thermal stability of Compositions 3 and 4 was then determined over a 60 minute period using an RDS. The samples of this RDS analysis were prepared in accordance with the same procedure set out in Example II.

The RDS monitored the viscosity (poise) of Compositions 3 and 4, individually, as a function of time (i.e., minutes). Specifically, after thermal equalibrium was established (i.e., approximately 2.5 minutes), the RDS monitored the viscosity of the individual resin samples in approximately 3 minute time intervals, until the time sweep was completed.

The data collected by the RDS, for comparative purposes, has been normalized by dividing all the viscosities for a given resin by the viscosity monitored at the initial reading. This normalized data is listed in Table X.

TABLE X

| | Effect of Oxygen Concentration on Thermal Stability | |
|---|---|---|
| | Normalized$^a$ Viscosity (poise) of: | |
| Time (minutes) | Composition 3 (Control) | Composition 4 (Invention) |
| 2.900 | 1.000$^b$ | 1.000$^c$ |
| 5.900 | 1.510 | 1.235 |
| 8.800 | 1.868 | 1.599 |
| 11.000 | 2.227 | 1.902 |
| 15.000 | 2.781 | 2.077 |
| 18.100 | 3.205 | 2.348 |
| 21.000 | 3.582 | 2.610 |
| 24.100 | 4.009 | 2.886 |
| 26.900 | 4.363 | 3.177 |
| 30.000 | 4.729 | 3.314 |
| 32.900 | 5.062 | 3.540 |
| 35.900 | 5.422 | 3.772 |
| 38.800 | 5.734 | 4.016 |
| 41.800 | 6.090 | 4.251 |
| 44.700 | 6.239 | 4.385 |
| 47.800 | 6.664 | 4.642 |
| 50.800 | 7.022 | 4.913 |
| 53.900 | 7.380 | 5.177 |
| 56.900 | 7.735 | 5.429 |
| 60.000 | 8.075 | 5.682 |

$^a$The viscosity data in this table has been normalized by dividing all the viscosities for a given resin by the viscosity monitored at initial reading.
$^b$Non-normalized data point is 32,981 poise.
$^c$Non-normalized data point is 40,074 poise.

Figure 8:
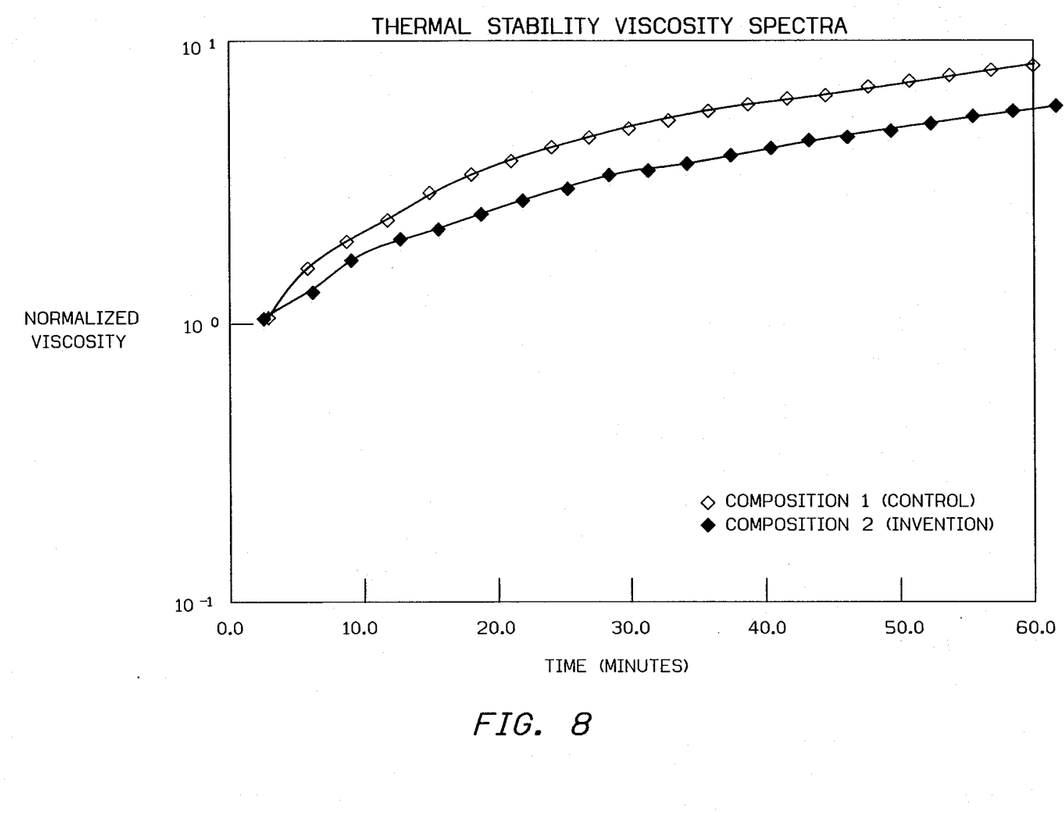
FIG. 8 is a Thermal Stability Viscosity Spectra of resins cured in the presence of an oxidizing atmosphere containing varying concentrations of oxygen.

To visually demonstrate the effectiveness of this invention, the data from Table X is plotted on the graph illustrated in FIG. 8. This data demonstrates that Composition 3, which was prepared from Resin 6, cured in a gaseous oxidizing atmosphere comprising a 20 volume % oxygen concentration, exhibits an increase in the melt viscosity of the polymer, during the curing process, of 707 volume %. The data further demonstrates that Composition 4, which was prepared from Resin 7, cured in a gaseous oxidizing atmosphere comprising a 10 volume % oxygen concentration, exhibits an increase in the melt viscosity of the polymer, during the curing process, of only 470 volume %. Therefore, the thermal stability of the polymeric composition which was made from the resin cured in the gaseous oxidizing atmosphere comprising a less than 10 volume % oxygen concentration (i.e., Composition 4 and Resin 7, respectively) was significantly improved over that of the polymeric composition prepared form the same resin cured in an oxidizing atmosphere comprising a 20 volume % oxygen concentration (i.e., Composition 3 and Resin 6, respectively).

It is evident from the foregoing that various modifications can be made into the embodiments of this invention, without departing from the spirit and scope thereof, which are apparent to those skilled in the art. Having thus described the invention, it is claimed as follows.

That which is claimed is:

1. A process for oxidatively curing a virgin poly(arylene sulfide) resin which comprises heating said resin in the form of solid particles, in the presence of a gaseous oxiding atmosphere comprising an oxygen content ranging from about 1 volume % to about 15 volume % oxygen, to a temperature in the range of about 10° C. to about 70° C. below the melting point of said resin for time sufficient to effect said curing.

2. A process in accordance with claim 1, which further comprises purging said solid particles after said oxidative cure with an inert fluid to free said cured solid particles of said oxidizing atmosphere.

3. A process in accordance with claim 2, which further comprises cooling said solid particles in the presence of said inert fluid and in the at least substantial absence of said oxidizing atmosphere to a temperature at which no significant amount of further curing of said solid particles would occur in the presence of said oxidizing atmosphere.

4. A process in accordance with claim 3, further comprising contacting the thus cooled solid particles with relatively cool air to further reduce the temperature of said solid particles.

5. A process in accordance with claim 1, wherein said oxidizing atmosphere comprises an oxygen content ranging from about 15 volume % to about 3 volume %.

6. A process in accordance with claim 5, wherein said oxidizing atmosphere comprises an oxygen content ranging from about 12 volume % to about 6 volume %.

7. A process in accordance with claim 6, wherein said oxidizing atmosphere comprises a oxygen content of about 10 volume %.

8. A process in accordance with claim 1, wherein said oxidizing atmosphere comprises a mixture of air and an inert gas.

9. A process in accordance with claim 8, wherein said inert gas is selected from the group consisting of steam, nitrogen, and carbon dioxide.

10. A process in accordance with claim 9, wherein said inert gas is nitrogen.

11. A process in accordance with claim 1, wherein said temperature to which said solid particles are heated is in the range of about 25° C. to about 55° C. below the melting point of said resin.

12. A process in accordance with claim 1, wherein said resin comprises -R-S- repeating units wherein R is phenylene, biphenylene, napthylene, biphenylene ether, or a lower alkyl derivative thereof.

13. A process in accordance with claim 12, wherein said resin is selected from the group consisting of poly(phenylene sulfide), poly(phenylene sulfide ketone), poly(phenylene sulfide diketone), and poly(biphenylene sulfide).

14. A process in accordance with claim 13, wherein said resin is poly(phenylene sulfide).

15. A process in accordance with claim 1, wherein said time during which said solid particles are heated is in the range of about 10 minutes to about 3 days.

16. A process in accordance with claim 15, wherein said time during which said solid particles are heated is in the range of about 2 to about 12 hours.

17. A cured poly(arylene sulfide) resin, wherein said resin is prepared by a process which comprises heating said resin in the form of solid particles, in the presence of an gaseous oxidizing atmosphere comprising and oxygen content ranging from about 1 volume % to about 15 volume %, to a temperature in the range of about 10° C. to about 70° C. below the melting point of said resin for a time sufficient to effect the desired level of cure.

18. A resin in accordance with claim 17, wherein said oxidizing atmosphere comprises an oxygen content ranging from about 15 volume % to about 3 volume %.

19. A resin in accordance with claim 18, wherein said oxidizing atmosphere comprises an oxygen content ranging from about 12 volume % to about 6 volume %.

20. A resin in accordance with claim 19, wherein said oxidizing atmosphere comprises a oxygen content of about 10 volume %.

21. A resin in accordance with claim 17, wherein said oxidizing atmosphere comprises a mixture of air and an inert gas.

22. A resin in accordance with claim 21, wherein said inert gas is selected from the group consisting of steam, nitrogen, and carbon dioxide.

23. A resin in accordance with claim 22, wherein said inert gas is nitrogen.

24. A resin in accordance with claim 17, wherein said temperature to which said solid particles are heated is in the range of about 25° C. to about 55° C. below the melting point of said resin.

25. A resin in accordance with claim 17, wherein said resin comprises -R-S- repeating units wherein R is phenylene, biphenylene, naphthylene, biphenylene ether, or a lower alkyl derivative thereof.

26. A resin in accordance with claim 25, wherein said resin is selected from the group consisting of poly(phenylene sulfide), poly(phenylene sulfide ketone), poly(phenylene sulfide diketone), and poly(biphenylene sulfide).

27. A resin in accordance with claim 26, wherein said resin is poly(phenylene sulfide).

28. A molded article made from said resin recited in claim 17.

29. A polymeric composition comprising:
(a) a cured poly(arylene sulfide) resin, wherein said resin is prepared by a process which comprises heating said resin in the form of solid particles, in the presence of a gaseous oxidizing atmosphere comprising an oxygen content ranging from about 1 volume % to about 15 volume %, to a temperature in the range of about 10° C. to about 70° C. below the melting point of said resin for a time sufficient to affect the desired level of cure, and
(b) fiberglass.

30. A composition in accordance with claim 29, further comprising a corrosion inhibiter.

31. A composition in accordance with claim 30, wherein said corrosion inhibiter is lithium carbonate.

32. A composition in accordance with claim 29, further comprising a mold release agent.

33. A composition in accordance with claim 32, wherein said mold release agent is high density polyethylene.

34. A composition in accordance with claim 29, wherein said oxidizing atmosphere comprises an oxygen content ranging from about 15 volume % to about 3 volume %.

35. A composition in accordance with claim 34, wherein said oxidizing atmosphere comprises an oxygen content ranging from about 12 volume % to about 6 volume %.

36. A composition in accordance with claim 35, wherein said oxidizing atmosphere comprises a oxygen content of about 10 volume %.

37. A composition in accordance with claim 29, wherein said oxidizing atmosphere comprises a mixture of air and an inert gas.

38. A composition in accordance with claim 37, wherein said inert gas is selected from the group consisting of steam, nitrogen, and carbon dioxide.

39. A composition in accordance with claim 38, wherein said inert gas is nitrogen.

40. A composition in accordance with claim 29, wherein said temperature to which said solid particles are heated is in the range of about 25° C. to about 55° C. below the melting point of said resin.

41. A composition in accordance with claim 29, wherein said resin comprises -R-S- repeating units wherein R is phenylene, biphenylene, naphthylene, biphenylene ether, or a lower alkyl derivative thereof.

42. A composition in accordance with claim 41, wherein said resin is selected from the group consisting of poly(phenylene sulfide), poly(phenylene sulfide ketone), poly(phenylene sulfide diketone), and poly(biphenylene sulfide).

43. A composition in accordance with claim 42, wherein said resin is poly(phenylene sulfide).

44. A molded article made from said composition recited in claim 29.

45. A process in accordance with claim 1 wherein said oxidizing atmosphere comprises an oxygen content ranging from about 10 volume % to about 1 volume %.

46. A process in accordance with claim 17 wherein said oxidizing atmosphere comprises an oxygen content ranging from about 10 volume % to about 1 volume %.

47. A process in accordance with claim 29 wherein said oxidizing atmosphere comprises an oxygen content ranging from about 10 volume % to about 1 volume %.

* * * * *